United States Patent
Charriau et al.

[11] Patent Number: 5,934,556
[45] Date of Patent: Aug. 10, 1999

[54] SPRAY NOZZLE CARRIER

[75] Inventors: Patrick Charriau, Saint-Sebastien; Pierrick Jouneau, Treillieres, both of France

[73] Assignee: York Neige, Sainte-Luce-sur-Loire, France

[21] Appl. No.: 08/786,301

[22] Filed: Jan. 22, 1997

[30] Foreign Application Priority Data

Jan. 22, 1996 [FR] France .................................. 96 00834

[51] Int. Cl.⁶ .................................................. F25C 3/04
[52] U.S. Cl. .................. 239/14.2; 239/280.5; 239/433; 239/532
[58] Field of Search ................... 239/2.2, 14.2, 239/273, 280–1, 280.5, 398, 433, 532

[56] References Cited

U.S. PATENT DOCUMENTS

| | | | |
|---|---|---|---|
| 3,301,485 | 1/1967 | Tropeano et al. | 239/2.2 |
| 3,761,020 | 9/1973 | Tropeano et al. | 239/2.2 |
| 3,770,062 | 11/1973 | Riggs | 169/24 |
| 3,774,842 | 11/1973 | Howell | 239/2.2 |
| 3,813,837 | 6/1974 | McClain et al. | 52/309 |
| 3,908,903 | 9/1975 | Burns, Jr. | 239/2.2 |
| 3,915,382 | 10/1975 | Davis | 239/195 |
| 3,952,949 | 4/1976 | Dupre | 239/2.2 |
| 3,969,908 | 7/1976 | Lawless et al. | 62/74 |
| 4,383,646 | 5/1983 | Smith | 239/14 |
| 4,915,302 | 4/1990 | Kraus et al. | 239/14.2 |
| 5,004,151 | 4/1991 | Dupre | 239/433 |
| 5,031,832 | 7/1991 | Ratnik et al. | 239/14.2 |
| 5,236,227 | 8/1993 | Adams et al. | 285/27 |
| 5,354,103 | 10/1994 | Torrence et al. | 285/137.1 |
| 5,360,163 | 11/1994 | Dupre | 239/14.2 |
| 5,667,137 | 9/1997 | Dupre | 239/14.2 |
| 5,718,378 | 2/1998 | Dupre | 239/14.2 |

FOREIGN PATENT DOCUMENTS

| | | |
|---|---|---|
| 780592 | 4/1935 | France . |
| 49509 | 5/1939 | France . |
| 2219289 | 9/1974 | France . |
| 1 434 607 | 3/1970 | Germany . |

*Primary Examiner*—Andres Kashnikow
*Assistant Examiner*—Lisa Ann Douglas
*Attorney, Agent, or Firm*—Young & Thompson

[57] ABSTRACT

The spray nozzle carrier is made up of a component made of light material obtaining by drawing. This component includes several internal cavities and, in particular two tubular cavities (4 and 5) used as channels for the passage of water and of compressed air, these cavities being separated by a central cavity (9) forming a technical chamber, this technical chamber allowing the fitting of elements for fixing the spray nozzle. The drawn component (2) has preferably, an elliptical shape, the large axis of which is located in the plane passing through the spraying axis of the nozzle. This carrier can comprise a long pole of length between 5 and 15 m, for example, in order to create an artificial snowfall with a snow gun situated at a great height.

10 Claims, 2 Drawing Sheets

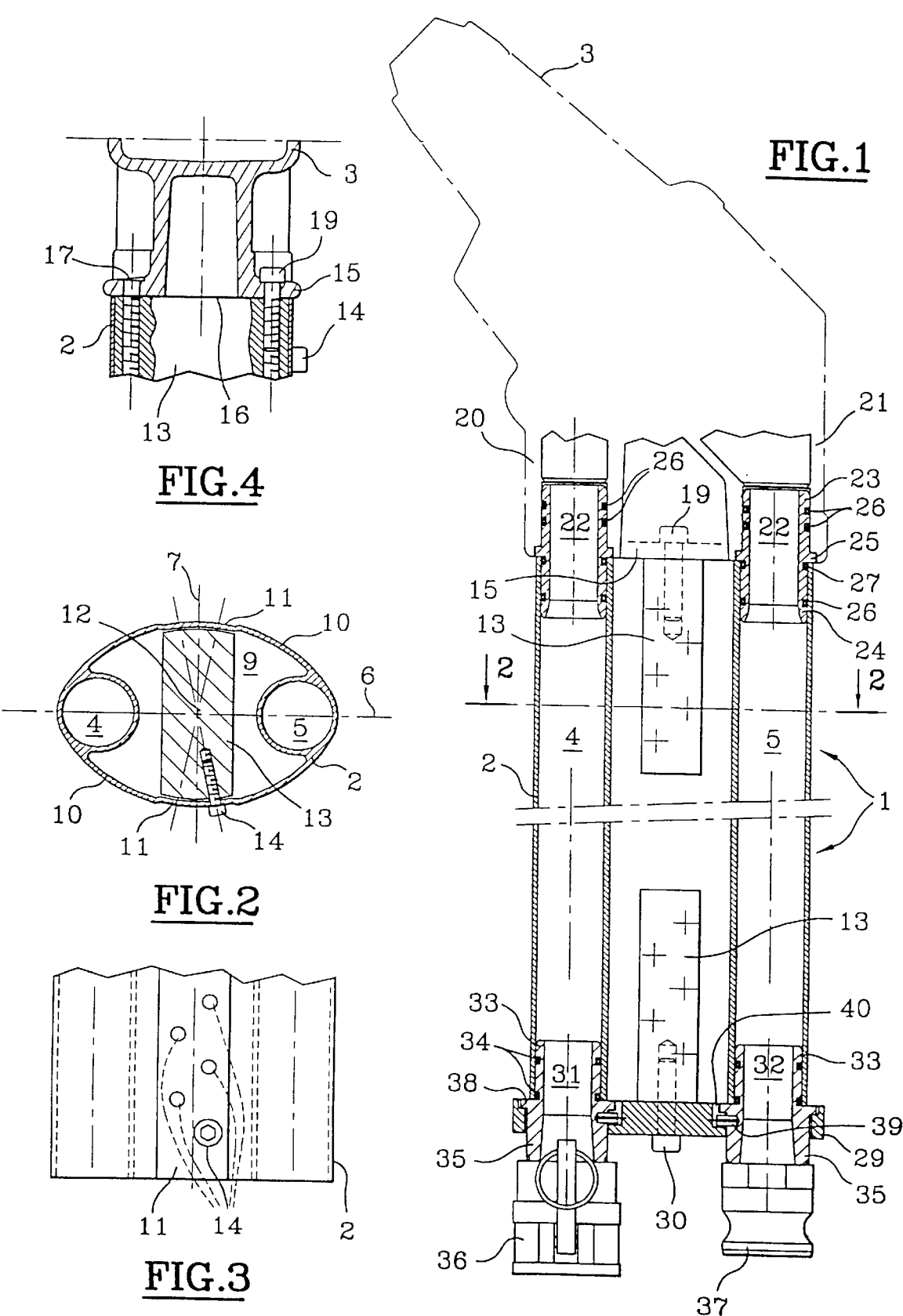

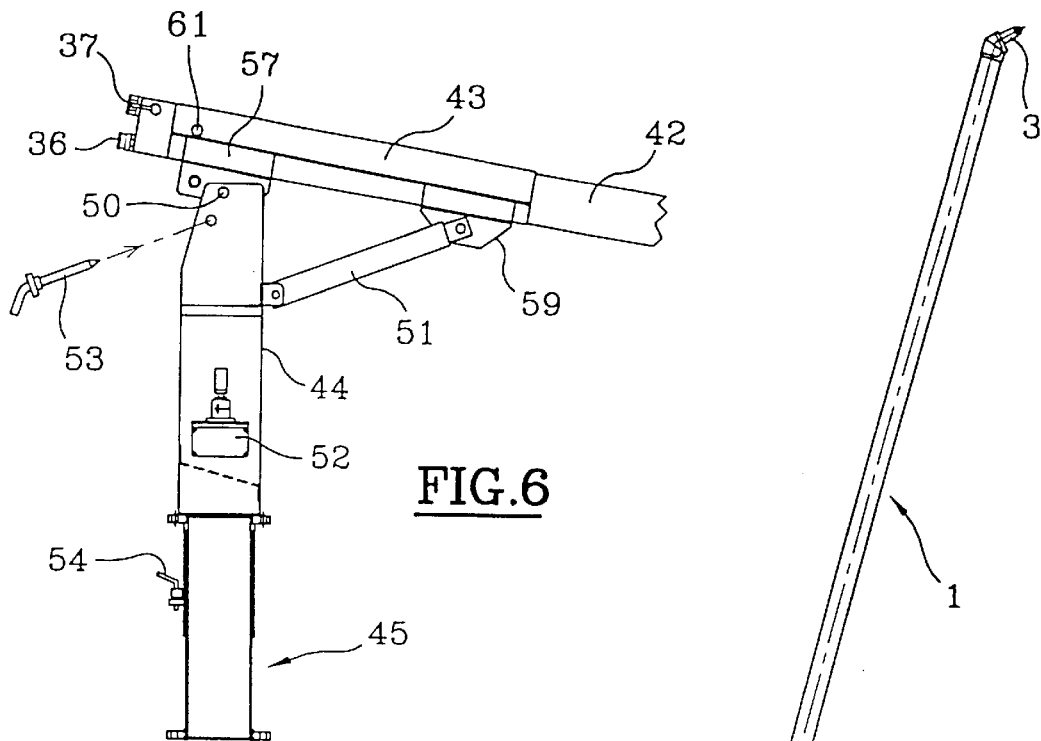
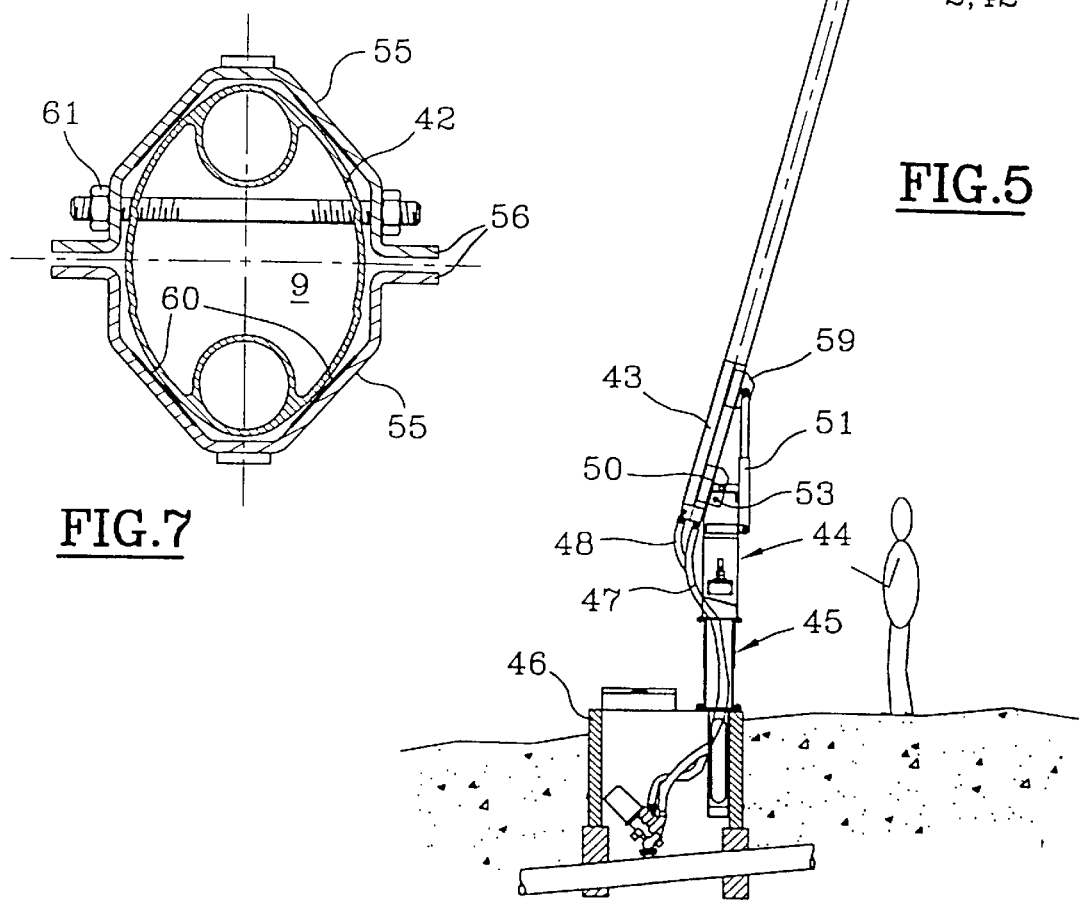

SPRAY NOZZLE CARRIER

FIELD OF THE INVENTION

This invention relates to a spray nozzle carrier. This carrier has the advantage of being particularly simple as much with regard to its construction as to its operation. It allows one to respond very easily, for example, to varying demands relating to its dimensions and, in particular, to its height.

SUMMARY OF THE INVENTION

This carrier, according to the invention, is made up of a component made of light material, obtained by drawing, the internal volume of which is divided up into several cavities, of which, at least the first cavity is used as a channel to transport pressurised water, intended to supply the nozzle, and a second cavity which is used as a technical chamber, notably, to allow the attachment of said nozzle directly to the end of said component.

According to a preferred arrangement of the invention, the drawn component includes a third cavity constituting another channel to transport the compressed air being used to supply the spray nozzle, this nozzle then being able to form a snow gun of the high pressure type, which ejects a mixture of water and air with a view to creating an artificial snowfall for ski runs.

Still according to the invention, the component forming the carrier has a cross section the outline of which is elliptical in shape, with a large axis which is in the plane of the projection axis or the resultant of the projection axes of the nozzle or nozzles.

According to another arrangement of the invention, the component forming the carrier includes two tubular channels, of the same diameter, arranged symmetrically with respect to the median plane passing through the small axis of the ellipse, these channels also being centered on the median plane of the large axis and these channels forming a part of the outline of the elliptical enclosure, this enclosure being also formed by the connecting walls between said channels, these walls defining with the channels, the technical chamber.

Still according to the invention, the sections of the external connecting walls include a portion of their surface in the form of an arc of a circle, the centre of which is situated at the intersection of the axes of the ellipse.

According to another arrangement of the invention, attachment of the nozzle is achieved by means of a block shaped so that it fits into the technical chamber, between the parts with cylindrical surfaces, this block being fixed, for example, by means of screws and the nozzle including a sole piece being supported on the end of the component, this sole piece including flange type fittings which allow it to be fixed to the intervening block also by using a screw.

Still according to the invention, the body of the spray nozzle includes two pipes with outlets at its sole piece, one for the air, the other for the water, with the distance between the centers corresponding to that between the air and water channels in the drawn component forming the carrier.

According to another arrangement of the invention, the connection of the nozzle pipes to the channels in the drawn component is carried out in a sealed fashion by means of cylindrical sleeves, these sleeves including a cylindrical part which is pushed into the pipes of the spray nozzle and a cylindrical post which is pushed into the channels of the drawn component, these cylindrical parts being separated by a collar sunk into the sole piece of the nozzle, a toroidal sealing ring being positioned in a groove under the collar in the upper part of the channel of the drawn component.

According to another arrangement of the invention, the two cylindrical parts of the sleeves, situated on both sides of the collar, have centers offset by a few tenths of a millimeter in a way that allows adjustment of the nozzle pipes in relation to the channel in the drawn component, this drawn component being generally produced with tolerances of a few tenths of a millimeter.

According to another arrangement of the invention, the drawn component includes, at its other end, sleeves held by a flange fixed by a screw onto a block which is linked to said component and which is positioned in the technical chamber, each sleeve being fitted with means for connecting with hoses or other devices allowing the supply of air and of water.

According to another arrangement of the invention, the drawn component is in the form of a pole whose length is between 5 and 15 m, this pole being held immobile in a clamping oversleeve, this oversleeve being hinged at its lower end, on a mount, about a horizontal axis, this mount being mobile and able to be interlocked around a vertical axis mounted on a pedestal fixed to the ground and in particular on a manhole.

Still according to the invention, the pole is mobile about its horizontal axis by means of a jack placed between its fixing sleeve and the hinged mount, this jack being operated by means of a hand operated pump, for example. This jack allows the pole to be drawn up to a quasi-vertical position. Means allow the pole to be held in a raised position; these means are, for example a pin which is of the type that automatically interlocks as soon as the jack is inactive.

BRIEF DESCRIPTION OF THE DRAWINGS

The invention will be explained in more detail with the help of the following description and the appended drawings, given for information only and in which:

FIG. 1 represents a spray nozzle carrier according to the invention;

FIG. 2 represents a cross section of the carrier along 2—2;

FIG. 3 is an external view of one of the ends of the carrier;

FIG. 4 represents a partial sectional drawing of the spray nozzle showing the part that forms a flange for fixing this nozzle onto the carrier;

FIG. 5 represents a long carrier forming a pole linked via a mount, to a pedestal mounted on a manhole;

FIG. 6 represents, on a larger scale, a portion of the pole in an inactive position, that is to say when the spray nozzle is situated at ground level;

FIG. 7 represents the oversleeve for clamping and fixing the pole.

DETAILED DESCRIPTION OF THE INVENTION

The carrier 1 shown in FIGS. 1 and 2, is made up of a rigid component 2, made of light material of the aluminum or aluminum alloy type, obtained directly by drawing. This carrier 1 receives, at the top end of the drawn component 2, a spray nozzle 3. This spray nozzle 3 can constitute a water jet spray. It can also constitute a snow gun that projects a mixture of water and air under pressure in order to produce snowfall on ski runs, for example.

The component 2 includes, for example, a channel 4 for the carrying of water under pressure and a channel 5 for carrying air under pressure.

The cross section of the drawn component 2, FIG. 2, constituting the carrier, has an elliptical shape. Channels 4 and 5 for carrying water and air under pressure are on its large axis 6. These tubular channels 4 and 5, which have the same diameter, shape the extremities of the ellipse. They are arranged symmetrically on either side of the small axis 7 of the ellipse.

The drawn component 2 includes three cavities: a cavity which corresponds to the channel 4 that carries water under pressure, a cavity which corresponds to the channel 5 that carries air under pressure and a central cavity 9, defined by channels 4 and 5 and by the walls 10. This central cavity 9 constitutes a sort of technical chamber which can allow the passage of cables, pipelines or other things and which above all allows the spray nozzle 3 to be fixed to the end of component 2.

The central part of the walls 10 includes, centered on the small axis 7 of the ellipse, a surface 11 formed in an arc of a circle, the centre 12 of which corresponds to the intersection of the axes 6 and 7 of the ellipse.

These surfaces 11 are arranged slightly set back towards the interior of the component and they allow a block 13 to be fixed at each of its ends.

This block 13 has two faces shaped to allow its housing and its adjustment between the surfaces 11. It is fixed to the ends of the component 2, by means of screws 14 which are centered on axes passing through the intersection of axes 6 and 7 of the ellipse.

The spray nozzle 3 includes a molded body which includes a sole piece 15, the external surface of which 16 is trimmed and placed on the end of the drawn component 2. This sole piece includes bosses 17 arranged so as to allow the passage of screws 19, these screws being secured in the block 13 arranged at the upper end of component 2.

The spray nozzle 3 is therefore simply placed on the end of component 2 which is as cut off. It is rigidly fixed to this component 2 by means of the block 13 which is positioned in the technical chamber 9, and it is attached by means of screws 19 which engage with said block 13.

The spray nozzle 3 of the snow gun type, includes pipes 20 and 21 for the passage of water and the passage of air respectively. These pipes 20 and 21 have outlets at the sole piece 15 and the distance between their centers corresponds to the distance between the centers of channels 4 and 5 respectively.

The connection of pipes 20, 21 to their respective channels 4, 5 and sealing of the joints is achieved by means of two identical sleeves 22. These sleeves 22 include a cylindrical part 23 positioned within the pipes of nozzle 3 and a cylindrical part 24 positioned within channels 4 and 5 of component 2.

These cylindrical parts 23 and 24 are separated externally, by a collar 25 which is housed in the lower edge of the nozzle at the sole piece 15, and which is lied, like the sole piece, on the end of component 2.

Toroidal sealing rings 26 ensure the seal between the sleeve 22 and the pipes or channels. A toroidal sealing ring 27 is positioned under the collar 25, in a groove in the cylindrical part 24, in order to create a seal at the upper end of component 2.

The cylindrical parts 23 and 24 of the sleeves 22 preferably have their centers offset by a few tenths of a millimeter, in relation to one another. This particular arrangement allows an adjustment to be carried out between component 2 and nozzle 3. Indeed, component 2 can have a centre to centre the distance for channels 4 and 5 which may vary by several tenths of a millimeter, because of the tolerances linked to the drawing technique.

On its lower part, component 2 also has a block 13 fixed by screw onto surfaces 11. This block 13 allows a flange 29 to be fixed by means of a screw 30 engaging with said block. This flange 29 holds sleeves 31, 32 in position. These sleeves 31 and 32 include a cylindrical part 33 mounted in a sealed fashion by seals 34 in channels 4 and 5 respectively. They also include a cylindrical part 35 which is externally threaded onto which connectors 36 and 37 are fixed allowing connection, for example, of flexible hoses.

These sleeves 31 and 32 include a collar 38 which separates the two cylindrical parts 33 and 35. This collar is housed in the flange 29, and also rests on the end of component 2 which is as cut. One of the toroidal sealing rings 34 is positioned under the collar 38 in a groove, at the end of channels 4 and 5 of component 2.

The sleeves 31 and 32 include a lug or pin 39 which allow them to be immobilized in rotation in relation to the flange 30. These lugs or pins are located in slots 40 made for this purpose in the flange 29.

The carrier 1 can be arranged in relation to its intended use. That is to say, when it is used with a simple pressurized water projection nozzle, the carrier can include one cavity 4 for the transport of water under pressure and one technical chamber 9 to allow notably the fixing of said nozzle and the supply connectors.

FIG. 5 represents a spraying installation and, in particular, an installation for creating an artificial snowfall. The carrier 1, still formed by a drawn component 2, is in the form of a long pole of between 5 and 15 m in length, which allows the spraying of a mixture of water and air at a great height, in relation to the ground, so as to obtain very good quality snow.

The elliptical cross section of component 2 which forms the pole 42 allows it to stand the different stresses and strains applied to it. The large axis 6 of the ellipse is in the same plane as the projection axis of the nozzle or in the same plane as the resultant of the projection axes if there are several nozzles.

The elliptical shape also allows wind resistance to be reduced. The contour of the pole without any bumps, also allows the formation of snow and ice deposits to be avoided.

This pole 42 is fixed, by means of a clamping oversleeve 43 to a mount 44. This mount 44 is itself mounted on a pedestal 45 and can pivot about a vertical axis. The pedestal 45 is secured on a manhole 46.

The manhole 46 is, for example, a brick built manhole which encloses the means of supplying water and air under pressure to the spray nozzle 3 via flexible hoses 47 and 48.

These hoses 47 and 48 are connected respectively to connectors 36 and 37 on the lower part of the pole 42.

The oversleeve 43 allows the pole to be locked and immobilized in an appropriate position, by means of bolts.

This oversleeve 43 is hinged in its lower part about a horizontal spindle 50 which is mounted on the mount 44.

A jack 51 is placed between the mount 44 and the oversleeve 43 to allow the pole 42 to be raised so as to position the spray nozzle high up. This jack 51 is operated by means of a manual pump, worked, for example, by an operator.

In its normal raised position, the pole 42 can be locked into position in relation to the mount 44 by means of a pin 53, this pin, for safety reasons, is for example able to interlock automatically when the jack is released, that is to say when the pole 42 comes down again.

The mount 44 is also able to interlock automatically with respect to the pedestal 45 in all positions, by any appropriate means, pin 54 or other means, over a circular sector of 360°.

FIG. 7 represents, in more detailed fashion, the oversleeve 43 which is made up of two half shells 55 which include lips 56 that allow them to be assembled by means of bolts which are not shown.

The lower half shell 55 includes the clevis 57 which permits articulation on the mount 44 through the use of the horizontal spindle 50. It also includes a clevis 59 that allows the articulation of the jack 51.

The half shells are produced in folded sheet metal shaped to receive the pole, which has an elliptical cross section. Rubber strips 60 are placed between the half shells 55 and the pole in order to protect the latter.

An extra screw 61, passing through the oversleeve and the wall of the technical chamber 9 can lock the assembly.

The reference signs inserted after the technical characteristics mentioned in the claims have the sole aim of facilitating understanding of the latter and do not limit the scope of the claims in any way.

We claim:

1. A spray nozzle carrier, comprising:
a single component having two ends and made of light material, and obtained by drawing, said component having an internal volume which is divided up into several cavities of which at least a first cavity is used as a channel for transporting water under pressure and a second cavity serves as a technical chamber for securing a nozzle directly onto one of the ends of said component, and for fixing at least one supply connection to the other end of said component, wherein the cross-section of the drawn component has an elliptically-shaped outline with a large axis in the plane of the axis or the resultant of the projection axis of the spray nozzle, the drawn component including at least two tubular channels of the same diameter, arranged symmetrically with respect to the median plane of the small axis of the ellipse, both channels being centered on the median plane of the large axis of the ellipse, and said channels defining with external walls of the component, the technical chamber.

2. A spray nozzle carrier according to claim 1, wherein the drawn component includes a third cavity constituted by a channel for transporting pressurized air intended to be supplied to said nozzle.

3. A spray nozzle carrier according to claim 1, wherein the external walls of the technical chamber include a surface in an arc of a circle, said circle having a center which is situated at the intersection of the two median planes of the drawn component.

4. A spray nozzle carrier according to claim 3, wherein the securement of the spray nozzle is carried out using a block having a shape adapted to be inserted into the technical chamber between the surfaces, said block being fixed by means of a screw at the end of the component between the surfaces, the nozzle including a sole piece fitted in the form of a flange in order to allow its attachment by means of a screw onto said block.

5. A spray nozzle carrier according to claim 4, wherein the nozzle has a body which includes two pipes with outlets at the sole piece, the distance between their centers corresponding approximately to that of the water and air channels of the drawn component.

6. A spray nozzle carrier according to claim 5, wherein the pipes of the spray nozzle are connected to the channels respectively in a sealed fashion by sleeves that comprise a first cylindrical part arranged in the pipes of the nozzle and a second cylindrical part arranged in the channels, said first and second cylindrical parts being separated by a collar embedded in the sole piece and under which is arranged a groove that permits the seating of a toroidal sealing ring which ensures the seal at the upper end of each channel of the drawn component.

7. A spray nozzle carrier according to claim 6, wherein the first and second cylindrical parts of the sleeves have their centers offset in relation to one another by a few tenths of a millimeter in order to allow an adjustment of said sleeves, and to allow an adjustment of the distance between their centers so as to make them correspond to the distance from center to center of the channels in the component, as well as to that of the pipes in the nozzle.

8. A spray nozzle carrier according to claim 3, further comprising on its lower part, a block secured to the surfaces of the technical chamber for fixing a flange, said flange being structured and arranged to immobilize sleeves onto which supply hoses are connected via connectors.

9. A spray nozzle carrier according to claim 1, wherein the drawn component has the shape of a pole, said pole having a length ranging between 5 and 15 meters, and being immobilized in a holding sleeve hinged with respect to a mount about a horizontal axis, said mount itself being mobile about a vertical axis on a pedestal, said pedestal adapted to be fixed to the ground on a manhole.

10. A spray nozzle carrier according to claim 9, wherein the pole is mobile about the horizontal axis by means of a manipulation jack fitted between the mount and the holding sleeve, said jack being driven by a hand-operated hydraulic pump for raising the pole, said pole being immobilized in a raised position with respect to its mount, by an automatically interlocking pin.

* * * * *